H. A. HOUSE.
SPRING CONTROLLER.
APPLICATION FILED AUG. 23, 1907.
927,048.
Patented July 6, 1909.
2 SHEETS—SHEET 1.
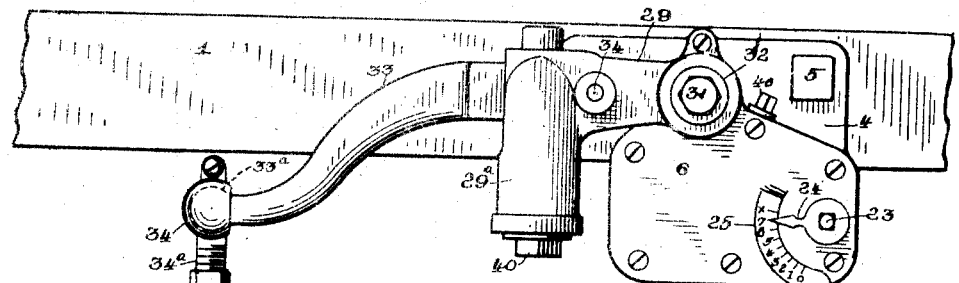
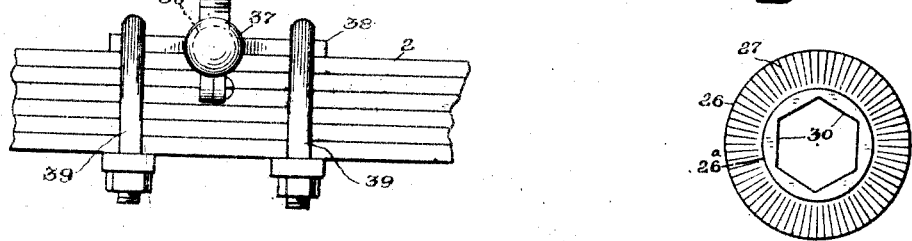
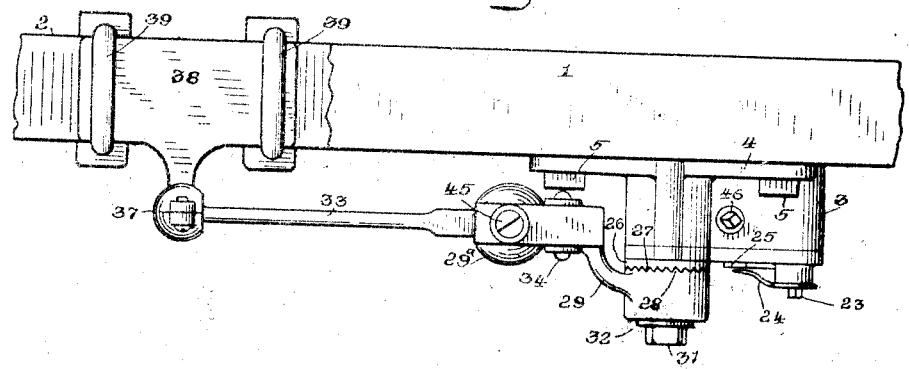
Witnesses:
Inventor
Henry A. House
By his Attorney H. A. HOUSE.
SPRING CONTROLLER.
APPLICATION FILED AUG. 23, 1907.
927,048.
Patented July 6, 1909.
2 SHEETS—SHEET 2.
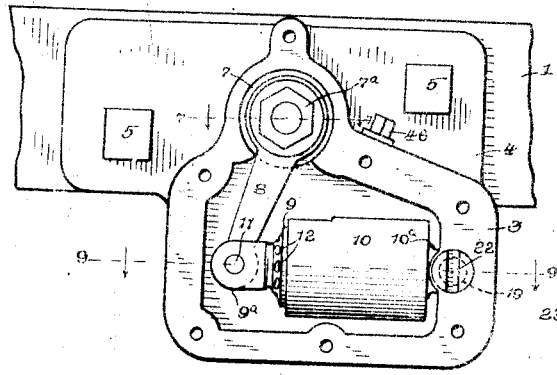
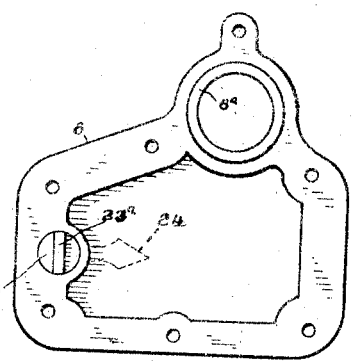
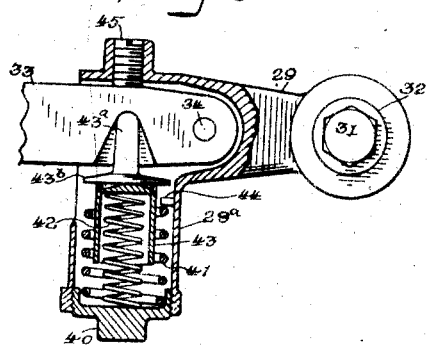
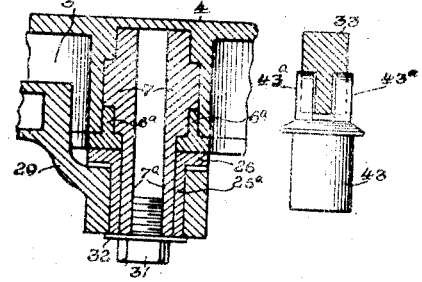
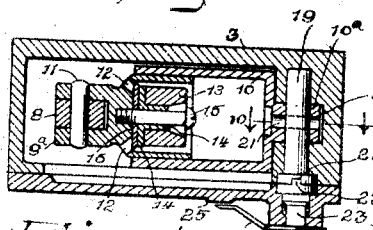
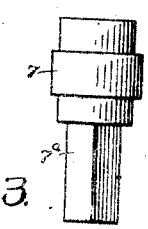
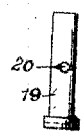
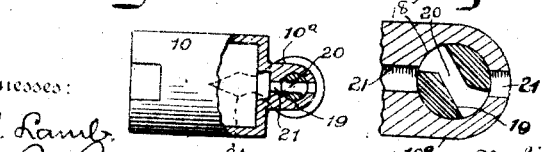
Witnesses:
H. A. Lamb
M. B. Ryan
Inventor
Henry A. House
By his Attorney
Geo. D. Phillips

UNITED STATES PATENT OFFICE.

HENRY A. HOUSE, OF BRIDGEPORT, CONNECTICUT.

SPRING-CONTROLLER.

No. 927,048.

Specification of Letters Patent.

Patented July 6, 1909.

Application filed August 23, 1907. Serial No. 389,792.

*To all whom it may concern:*

Be it known that I, HENRY A. HOUSE, a citizen of the United States, and a resident of Bridgeport, in the county of Fairfield and State of Connecticut, have invented certain new and useful Improvements in Spring-Controllers, of which the following is a specification.

My invention relates to vehicle spring controllers, and it has for its object to provide a controller for the springs of automobiles and vehicles of like character which will be both yielding and readily made adjustable to the load. To this end I have employed the "hydrostatic" system, which consists in submerging the pumps or cylinders in a liquid within a tightly sealed case or chamber devoid of working packed joints or other avenues of escape for the liquid, which working packed joints are commonly found in devices employing this system.

Another feature of my invention is to arrange a graduated scale or index on the exterior of the case whereby the controller can be readily adjusted to suit the load or weight of the automobile or car to which the controller is attached.

To enable others to understand my invention reference is had to the accompanying drawings, in which:

Figure 1 represents a front side elevation of the spring controller, broken view of the frame of a car, and broken view of one of the car springs; Fig. 2 is a broken upper plan view of the frame of a car and one of the car springs and upper plan view of the controller connected thereto; Fig. 3 is an enlarged detail front elevation of the adjusting sleeve; Fig. 4 is an enlarged broken view of the car frame and an enlarged side elevation of the liquid holding or pump case attached thereto with its cover removed; Fig. 5 is an enlarged detail reverse view of the case cover; Fig. 6 is an enlarged broken elevation vation partly in section of the crank adjusting arm, sectional view of the adjustable compression spring and broken view of the hinge-lever; Fig. 7 is an enlarged broken sectional view on line 7 of Fig. 4; Fig. 8 is an enlarged cross sectional view of the hinge-lever, and detail view of the vibrating spring housing; Fig. 9 is an enlarged sectional view of the pump case and pump on line 9 of Fig. 4; Fig. 10 is an enlarged broken detail view partly in section of the pump on line 10 of Fig. 9; Fig. 11 is an enlarged detail view of the pump crank; Fig. 12 is an enlarged detail view of the adjustable pump hinge pin; and Fig. 13 is an enlarged broken sectional view of the hinge portion of the pump, and cross sectional view of the pump hinge pin.

1 represents one of the side frames of a car, and 2 one of the car springs.

3 is the pump case, having the flange 4 by means of which it is secured to the side of the frame by the bolts 5.

6 is the cover for the pump case. 7 is the crank-shaft which is journaled in the upper part of said case and it is operatively held therein by the flange portion $6^a$ of the cover, as seen more clearly at Fig. 7.

8 (see Figs. 4 and 9) is an arm integral with and depending from the crank-shaft whose lower end is pivotally connected to the piston 9 operatively mounted in the pump cylinder 10. This connection is effected through the medium of the pin 11 extending through the head portion $9^a$ of the piston.

12 are holes in the head of the piston for the admission of liquid from the interior of the case to the interior of the pump.

13 is a block of elastic cork, the object of which will hereinafter be more fully described. This cork is mounted on the flange 14, which flange is endwise movably supported on the stationary screw 15, and 16 is a packing adapted to close the ports 12 when the pressure of the liquid is on the opposite end of the piston.

The head portion $10^a$ of the pump is freely inserted in the recess 17 (Fig. 9) of the end wall of the case and it has the hole 18 (Fig. 13) therethrough by means of which it is pivotally connected to the pump hinge pin 19, having the transverse port 20 therethrough, as also seen at Figs. 10, 12 and 13, which port is adapted to register with port 21 of the head $10^a$ of the pump. The head portion of the hinge pin is provided with the screw driver slot 22 (Figs. 4 and 9), and 23 is a short shaft journaled in the cover 6 (see also Fig. 5) whose inner end is provided with a screw driver-like point $23^a$, which point is adapted to register with the slot 22 in the hinge pin. The projecting end of this shaft (see also Fig. 1) carries the indicating hand 24 adapted to be moved over the dial or registering scale 25 on the outside of the cover 6. The outer end of the shaft 23 is squared to receive a wrench so that the hinge pin may be rotatively adjusted with respect to the resistance offered to the piston and the load sustained by the car. This resistance is in the form of glycerin or other like non-evaporating liquid with which the case 3 is filled. The backward stroke of the piston will draw the liquid through the ports 12 into the interior of the pump by forcing back the packing 16, and the forward stroke will close said ports. As before mentioned, the resistance offered by the non-compressible liquid to the piston on its forward stroke, is proportional to the load or weight of the car, and is regulated by the amount of opening of the liquid discharge port, and this opening is readily determined by the scale 25 on the exterior of the case cover.

Referring to Fig. 1, when the hand 24 is brought to the zero mark on the scale, it will indicate a full open discharge port, as shown at Figs. 9 and 10, with no resistance on the piston. The other marks on the scale from 1 to 7 will indicate different openings of the discharge port and varying resistance on the piston corresponding to said openings. When the indicating hand is moved to the mark X on the scale it will indicate that the discharge port is fully closed. The value of each mark on the scale can be predetermined so that each mark will indicate the load to be sustained. In other words, the weight of the car itself added to the load carried by the car. By means of this visible scale and indicating hand, it will readily be seen how easily the controller can be accurately and quickly set for the weight and varying load of any car. In attaching devices of this character to cars, they are adjusted to conform to the weight of the car plus the load the car is capable of carrying so that, if the car is built to carry seven persons, the adjustment is made to correspond thereto, and if at any time the number be less, the car will lack the proper resiliency for easy riding. But with my improved means of adjustment, the slightest variation in the load can be quickly taken care of.

26 (Figs. 2, 3 and 7) is an adjusting sleeve having the teeth 27 on its vertical face adapted to register with the teeth 28 on the vertical face of the hub portion of the crank adjusting arm 29. The sleeve 26 has the hexagon center 30 adapted to have a sliding fit on the hexagon end 7ª (Fig. 11) of the crank 7. The arm 29 is mounted on the flange portion 26ª of the sleeve 26 and said sleeve and arm are held in place by the screw 31 and washer 32, shown at Figs. 1, 2 and 7.

33 is a lever pivotally supported on the arm 29 by the pin 34. The opposite end of this lever is provided with the ball 33ª to work in a circular seat formed in the head 34 whose threaded shank 34ª is inserted in one end of the adjusting nut 35.

36 is a ball having the threaded shank inserted in the lower end of the nut 35. The ball 36 operates in a circular seat in the head portion 37 of the plate 38, which plate is secured to the car spring by the clips 39. The parts 34ª, 35 and 36ª form an adjustable connection between the lever 33 and the car spring 2.

The adjusting arm 29 has the depending socket portion 29ª (Figs. 1 and 6) in whose open threaded mouth is located the adjustable threaded plug 40 supporting and adjusting the large compression spring 41 and the flexible riding spring 42. 43 is a housing (see also Fig. 8) whose ears 43ª embrace the lever 33 for centralizing said housing. The lower end of the flexible riding spring 42 rests, as before mentioned, on the adjustable plug 40, while its upper end is seated at the bottom of the open mouth of the housing. The upper end of the compression spring 41 engages with the lug 44. A groove (not shown) in the head portion 43ᵇ of the housing enables said housing to be depressed by or past said lug without contacting therewith. 45 is an adjustable screw in the crank adjusting arm 29 whose point contacts with the lever 33.

As there is more or less variation between the frame and springs of different make of cars, I am able to readily adjust my improved controller to any car by means of the toothed sleeve 26 and the toothed hub portion of the arm 29. When the car is standing still, the normal position of the pump piston is at its extreme outward stroke as shown at Figs. 4 and 9. To adjust the controller to the varying distances, the arm 29 is temporarily removed and the crank shaft rotated to properly locate the piston, and as the sleeve 26 (Fig. 3) has a hexagon bore and an odd number of teeth, it will be readily seen that any amount of variation in the height of the free or ball end of the lever 33 can be had by simply placing the adjusting sleeve in the proper position on the hexagon end of the crank-shaft, while for a minute adjustment the connection between the end of the lever 33 and spring 2 can be secured by means of the long nut 35.

The riding spring 42 gives a limited vertical movement or play to the end of the lever 33 for the normal vibration of the running gears of the car; but when a sudden jolt occurs and abnormally depresses the car spring, its sudden reaction is checked by the piston 9 acting against the liquid in the pump, which liquid will be forced out of the pump in quantities proportionate to the load sustained by the car. In other words, the greater the load the slower the liquid will escape and, consequently, a slower reaction or recovery of the frame to a normal condition will be the result. The advantage derived from being able to adjust the escape ports of the pump by means of the indicating hand and dial or scale to the load, and to do this from the outside of the case, will be greatly appreciated by all users of cars.

By means of the compressible and resilient nature of the cork 13 carried in the piston, and the large compression spring 41 carried by the arm 29, the sudden jar or jolt that would otherwise occur the instant the piston met the resistance offered by the liquid is fully overcome, for the instant this sudden check takes place the downward momentum, previously acquired by the frame, will be absorbed by said compression spring and cork, and the reaction or upward movement of the frame will be gradual and easy while the liquid is being forced out of the pump.

The screw 46 is adapted to close an opening in the side of the case for filling said case with liquid.

Having thus described my invention, what I claim as new and desire to secure by Letters Patent is:—

1. In a car spring controller of the character described, a liquid holding case adapted to be attached to the car frame, a pump located within the case and having inlet and discharge ports, means on the exterior of the case for controlling and indicating the amount of opening of the discharge port, for the purpose set forth.

2. In a car spring controller of the character described, a liquid holding case adapted to be attached to the car frame, a pump and its piston located within the case, said piston having inlet ports and means for automatically closing said ports, compressible material carried by the piston, a hinge pin journaled in the case and having a transverse discharge port therethrough, said pump pivotally mounted on the hinge pin and having a discharge port registering with the discharge port of said pin, means on the exterior of the case for controlling and indicating the amount of opening of the discharge ports and a corresponding resistance offered to the piston, for the purpose set forth.

3. In a car spring controller of the character described, a liquid holding case secured to the car frame, a pump and its piston within the case, a rotatable hinge pin in the case, said pump and hinge pin having discharge ports adapted to register with each other, the piston having inlet ports, a crank shaft journaled in the case and means for operatively connecting the piston therewith, means on the exterior of the case for rotating the hinge pin so as to open and close the discharge ports and thus control and indicate the resistance offered to the piston on its forward stroke, means for connecting the crank shaft with the car spring, for the purpose set forth.

4. In a car spring controller of the character described, a liquid holding case attached to the car frame, a rotatable hinge pin journaled in the case having a discharge port, a pump within the case having inlet ports, said pump pivotally mounted on said pin and having a discharge port adapted to register with the discharge port of the pin, means on the exterior of the case for controlling and indicating the amount of opening of the discharge ports and the corresponding resistance offered to the piston on its forward stroke, a crank shaft journaled in the case and having an arm to operate the pump, the crank pin having an angular projecting end, an adjusting sleeve carrying teeth and having an angular bore adapted to be mounted on the crank shaft, an adjusting arm mounted on the sleeve and having teeth to register with the teeth of the sleeve, a flexible riding spring and a compression spring carried by the adjusting arm, a lever pivoted to said arm and in flexible engagement with said springs, means for adjustably connecting the opposite end of the lever with the car spring, for the purpose set forth.

5. In a car spring controller of the character described, a liquid holding case adapted to be attached to the car frame, a pump having inlet and discharge ports within the case, a hinge-pin for the pump, said pin journaled in the case and having a discharge port adapted to register with discharge port of the pump, means on the exterior of the case for rotating said pin and thereby regulate the amount of opening of the discharge ports, for the purpose set forth.

6. In a car spring controller of the character described, a liquid holding case adapted to be attached to the car frame, a pump within the case having inlet and discharge ports, a rotatable support for the pump having a discharge port to register with the discharge port of the pump, a crank shaft journaled in the case having an arm for actuating the pump, a toothed sleeve removably mounted on said shaft, an adjusting arm having a toothed member to register with the toothed sleeve, a lever pivoted to said arm, means for adjustably connecting said arm with the car spring and means for flexibly supporting the lever on the adjusting arm, for the purpose set forth.

Signed at Bridgeport in the county of Fairfield and State of Connecticut this 22d day of Aug. A. D. 1907.

HENRY A. HOUSE.

Witnesses:
 GEO. D. PHILLIPS,
 EDMOND C. WOOD.